Patented Oct. 11, 1938

2,132,886

UNITED STATES PATENT OFFICE 2,132,886

METHOD OF PREPARING COLLOIDAL COMPOUNDS OF SILVER AND MERCURY

Earl V. Voelker, Seattle, Wash., assignor to S. M. Laboratories, Inc., Seattle, Wash., a corporation of Washington No Drawing. Application June 2, 1934,
Serial No. 728,787

2 Claims. (Cl. 167—14)

This invention relates to a process of preparing a stable colloidal suspension of silver and mercury having valuable therapeutic properties.

Colloidal silver compounds and colloidal mercury compounds have been known heretofore, but each of these is unstable in solution, precipitates readily in dilute acid solutions, and deteriorates rapidly in bactericidal effectiveness, thus losing its therapeutic value. Never before, so far as I am aware, has silver or mercury ever been produced in stable colloidal solution, nor have the two been combined into a stable colloidal solution.

Accordingly one of the objects of this invention is to form a stable aqueous colloidal solution incorporating both silver and mercury, thus combining in pronounced synergistic association the therapeutic properties of the two, and making possible the production of such a compound at lessened cost because of the possibility of lessening the amount of silver, which is the expensive ingredient, by increasing the percentage of mercury, the germicidal properties of which are substantially equivalent to those of silver.

In carrying out the invention I first dissolve egg albumen or any other suitable protective colloid-forming protein in a solution of sodium hydroxide or other suitable alkaline substance to denature the albumen. To the denatured product are added a solution of a silver salt and a solution of a mercuric salt. The resulting solution is maintained at a temperature between 55° and 60° centigrade for a suitable length of time (approximately four hours) until the silver and mercury, their oxides and their other compounds formed, all assume a colloidal form. There results a water-soluble, combination colloidal composition containing silver and mercury, surrounded by a protein protective colloid, which is stable, and which has high therapeutic properties.

No definite limits can be given to the relative amounts of silver and mercury in the compound. Both may be varying factors, and the ratio adjusted to suit a definite need. It appears that the combination colloid, in addition to particles of free silver and mercury, oxide particles of each metal, and particles of other compounds of the metals, incorporates particles containing both silver and mercury, perhaps in the form of an amalgam and by reason of this is stable in character, and exhibits the properties of all stable colloidal substances. The silver and the mercury, in the intimate association resulting from this process, appear to assist each other in maintaining the stability of the solution, and act synergistically in a bactericidal and therapeutic sense.

This pronounced synergistic action of the silver and mercury in the combination colloid seems to be unique in my composition. The employment of silver gives stability to the mercury in colloidal solution, for a stable colloid of mercury is not obtained from my process in the absence of silver.

As an example of the process of manufacture and the proportions found suitable, I give the following. Place in a suitable container 425 grams of powdered egg albumen dissolved in a suitable quantity—say 7000 c. c.—of distilled water with the aid of 25 grams of sodium hydroxide. The solution is brought to a temperature in the neighborhood of 85° C. and maintained for about twenty minutes to aid the sodium hydroxide in denaturing and thoroughly dissolving the egg albumen. The details of this step are well known, and form no essential part of my invention. There may then be added approximately 75 grams of bile salts, or other suitable combination of choleates, or separate choleates to increase the penetration of the resulting product for clinical purposes. The whole is then cooled and filtered to remove any undenatured egg albumen. The temperature of the filtrate is then raised to between 55° and 60° C., after which a solution of 90 grams of silver nitrate and a solution of 30 grams of mercuric nitrate dissolved in water are slowly added, preferably simultaneously, to the denatured solution of albumen, and the temperature is then maintained at approximately 55° C. for perhaps four hours, until the silver and mercury assume colloidal form. The resulting liquid is allowed to cool, and may be purified by dialyzing or by any other suitable method to free it from organic and inorganic crystalloid substances. When the reaction is complete the protein, in the example the egg albumen, will have formed a protein protective colloid for the silver and mercury colloids. This constitutes the protein-protected, combination colloid.

I have described in some detail the proportions and process whereby the composition may be made. The combination colloid may be used wherever a silver colloid or a mercury colloid may be used, and has advantages thereover because of its stability, and because it is non-irritating. Each can be used for such purposes as is indicated. It will be understood, then, that the invention is not restricted, in process nor in proportions or ingredients, to those given by way of example. The ratio of mercury and silver content in the combination colloid may be varied, and the bile salts may or may not be included depending on the purpose for which the composition is to be used.

Specific tests may be applied to my new composition to recognize it as distinguished from similar compositions known to the prior art. These tests indicate superiority in germicidal power obtained by the aforementioned synergistic action of the associated mercury and silver colloids. Two parallel tests employing the standard Federal Dept. of Agriculture transfer method determining the effect of various solutions of my composition, as compared with well known silver colloid preparations, on a standard *Staphylococcus aureus* culture exposed at 37° C. showed the following results. (0 indicates a negative test showing sterilization and X indicates that all bacteria have not been killed.)

Table I

| | Solutions of my compound colloid | | | | | | | "Neo Silvol" 10% | "Argyrol" 10% | Phenol control 1-90 |
|---|---|---|---|---|---|---|---|---|---|---|
| | 10% | 5% | 4% | 3% | 2% | 1% | 0.5% | | | |
| 5 min | 00 | 00 | 00 | 00 | 00 | X0 | XX | XX | XX | X |
| 10 min | 00 | 00 | 00 | 00 | 00 | 00 | XX | XX | XX | 0 |
| 15 min | 00 | 00 | 00 | 00 | 00 | 00 | X0 | 0X | 0X | 0 |
| 1 hr | 00 | 00 | 00 | 00 | 00 | 00 | 00 | 0X | 00 | 0 |

The germicidal performance of my composition in an acid diluent may be shown by employing urine as a diluent in place of water in similar tests by the Federal Dept. of Agriculture transfer method on a standard culture. Following is the result:

1. Using normal urine pH 6.8 as a diluent instead of water.

2. In another test made at the same time 10% of beef serum was added to the urine dilution at the same time the organisms were added. The phenol control was diluted with water.

Table II

| | Urine diluent | | | | Urine and serum | | | | Phenol control 1-90 |
|---|---|---|---|---|---|---|---|---|---|
| | 3% | 2% | 1% | 0.5% | 3% | 2% | 1% | 0.5% | |
| 5 min | XX | XX | X | X | 0X | XX | X | X | X |
| 10 min | 0X | 0X | X | X | 0X | XX | X | X | 0 |
| 15 min | 0X | 0X | X | X | 0X | 0X | X | X | 0 |
| 30 min | 0X | 0X | X | X | 00 | XX | X | X | |
| 1 hr | 00 | 0X | 0 | X | 00 | 0X | X | X | |
| 1.5 hr | 00 | 0X | 0 | X | 00 | 0X | X | X | |
| 2.0 hr | | 00 | X | X | | 00 | X | X | |

Conventional colloids lose most of their bactericidal effectiveness under such acidic conditions, and hence have little utility in treating bladder diseases, for which purpose my composition is particularly well adapted because of its more stable nature and bactericidal activity under such conditions.

The property of bactericidal stability was tested by allowing a solution of my composition to stand for several months. At the end of three months no appreciable decrease in germicidal effectiveness could be detected. At the end of six months less than 10% loss in effectiveness had occurred. Colloidal silver or colloidal mercury or physical mixtures of the two lose practically all their bactericidal properties in less than two months.

The tendency of solutions of this composition to irritate, even up to 3% strength, is slight as compared to solutions of other substances of a strength sufficient even to approach the bactericidal effectiveness of such solutions of my composition.

Chemical analyses alone are inadequate to distinguish definitely my product from all other products. The facts of its water-solubility, that it contains both silver and mercury, and that it is organic in nature, may be ascertained by analytical methods. Such methods, however, would not distinguish my product from a mechanical mixture of a water-soluble organic silver colloid and a water-soluble organic mercury colloid. For the purpose of distinguishing my combination colloid from such a mechanical mixture, one may resort to a cataphoresis test. Such a test may be conducted by placing a sample of the combination colloid in a U-tube, with a layer of distilled water above such sample in each side of the U-tube. Electric terminals may then be placed one in each arm of the U-tube, and a current of electricity passed through the solution. A distinct column shift will occur under these circumstances, the level of the solution being tested rising appreciably in one side of the U-tube. While the color of this risen portion will not be quite as dark brown as that of the main body, when observed carefully, it nevertheless will be quite dark.

When mechanical mixtures of the type mentioned above are submitted to such cataphoresis tests, little or no column shift occurs, although there is a slight light colored dispersion of color into the distilled water. Such dispersion, however, is easily distinguished from the definite column shift without dispersion, which is characteristic of the cataphoresis test of my combination colloid.

What I claim as my invention is:

1. The process of preparing water-soluble, protein-protected, combination colloid of silver and mercury, which comprises dissolving a protein in alkaline solution, adding thereto in the same step solutions of a silver salt and a mercury salt, and maintaining the resulting mixture at an elevated temperature until the silver and mercury assume colloidal form.

2. The process of preparing a water-soluble, protein-protected, combination colloid of silver and mercury, which comprises dissolving a protein in alkaline solution, adding thereto bile salts, thereafter adding substantially simultaneously a silver salt solution and a mercury salt solution, and maintaining the resulting mixture at an elevated temperature until the silver and mercury assume colloidal form.

EARL V. VOELKER.